United States Patent

[11] 3,589,052

| [72] | Inventor | Harold M. King<br>Jarrettsville Pike, Phoenix, Md. 21131 |
| --- | --- | --- |
| [21] | Appl. No. | 816,226 |
| [22] | Filed | Apr. 15, 1969 |
| [45] | Patented | June 29, 1971 |

[54] AUTOMATIC SINKER
15 Claims, 11 Drawing Figs.

[52] U.S. Cl. ............................................. 43/44.88,
43/44.91, 24/116 A, 24/134
[51] Int. Cl. ........................................... A01k 95/00
[50] Field of Search ........................................ 43/44.88,
44.87, 44.91, 44.93, 44.85, 27.4; 24/134, 116.1

[56]  References Cited
UNITED STATES PATENTS

| 1,298,614 | 3/1919 | Whitkanack | 24/134 |
| 2,440,989 | 5/1948 | Van Brunt | 43/44.88 X |
| 2,494,620 | 1/1950 | Johnson | 43/42.19 |
| 2,545,326 | 3/1951 | Westfall et al. | 43/44.85 X |
| 2,640,239 | 6/1953 | Schneider | 24/116 (1) |

Primary Examiner—Samuel Koren
Assistant Examiner—Daniel J. Leach
Attorney—John F. McClellan, Sr.

ABSTRACT: A fishing line sinker comprising a substantially-elongated body member having a longitudinal opening for the passage of a fishing line therethrough. The fishing line includes bead chain means secured at both ends to sections of the line. A transverse aperture is provided through the body wall to the longitudinal opening and has pivotally mounted therein a cam member having a toothed working face adapted to engage beads of the chain to releasably lock the sinker to the line. The sinker is manually releasable and also automatically releasable from the line to slide therealong when reeled-in against the rod tip, thus allowing the remainder of the line to be reeled-in for removal of fish for lure changing, or for storage.

PATENTED JUN29 1971

3,589,052

INVENTOR
HAROLD M. KING
BY John F. McClellan Sr.
ATTORNEY

AUTOMATIC SINKER

This invention relates to fishing equipment and more particularly to line-mounted sinkers such as those employed in fishing with rod and reel.

Line-mounted sinkers are available in several types. Amount these are sinkers designed for permanent fastening at one position on the line, sinkers designed for dropping free of the line or jettisoning, and sinkers designed for adjustable positioning on the line.

Sinkers designed for adjustable positioning on the line are of two types: sinkers manually repositionable, and sinkers which are also automatically repositioned on the happening of some event.

The sinker of the present invention is of the type which is automatically repositioned as well as manually repositionable. The repositioning event is the contacting of one end of the sinker against the rod tip guide as the line is reeled in, and the repositioning is a relatively free sliding of the sinker down the line to the lure, or to a swivel or other stop placed ahead of the lure.

For several reasons, sinker repositioning of this nature is a useful safety and convenience provision, as will be seen from the following description.

Very few sinkers are small enough to pass through the lines guides of fishing rods with which they are used. For example, this is especially true of trolling rigs in which heavy sinkers are used, ranging up to several ounces and sometimes to a pound or more in weight, depending on the application. The massive trolling sinker is typically fixed to the line as much as 25 or 30 feet ahead of the lure, so that the lure better simulates a small agile creature swimming along by itself. To further this illusion, the sinker is often farther separated from the lure by means of a drop-sinker arrangement. In the drop-sinker arrangement a sinker is suspended at the end of a short line attached several feet ahead of the lure, so that the sinker is trolled through the water not only ahead of the lure but also deeper than the lure.

The fixed-sinker arrangements commonly used in the prior art become awkward to handle on the frequent occasions when it is necessary to remove the line from the water. The line is reeled in until stopped by jamming of the sinker against the tip guide on the rod, leaving many feet of line, terminated by a hook assembly, dangling in the water. The dangling remainder of the line is then retrieved by extending the rod up and to the rear with one hand, grabbing for the line with the other hand, and then retrieving any excess length hand-over-hand. This retrieval can be troublesome and even hazardous, particularly if there is a fish on the hook. Storage of the line and hook so-rigged is also troublesome and less safe than it should be, consisting usually of manually winding the line about the exterior of the reel and engaging the hook as securely as possible to some projection.

The alternative to this procedure in the past has been to jettison the sinker altogether before reeling in, or to secure the sinker to the line by friction, at the expense of extra trouble, uncertain operation and possible damage to the line. Various friction means have been used to secure the sinker, including arm-cams, ball-cams, spring clips, and the like, working directly on the line. These devices have required repositioning by estimate, and in some cases, rethreading of a portion of the sinker after release. And the prior art devices have included no provision for drop sinker use, or for use with every type of line.

According to the present invention these difficulties are eliminated. Any desired separation may be had between lure and sinker without sacrifice of positive positioning of the sinker or convenience and safety of operation of the tackle. When it is desired to reel in the lure, as for example, to take aboard a fish, the angler simply continues reeling as if there were no sinker on the line, until the fish brought in as close as desired, even to the rod-tip if necessary.

The present invention provides, in a typical embodiment, a sinker having a cam-actuated tooth engagement with a length of bead chain spliced in the fishing line. In other embodiments, the same principle is used in adjustable weight sinker carriers, and in a drop-sinker carrier. In every embodiment the sinker or sinker carrier is automatically freed to slip on the line by releasing action of the bead chain on the toothed cam as the appropriate end of the sinker or sinker carrier contacts the rod tip guide.

If, for some special reason, the angler wants to rig his tackle so that the sinker of this invention does not release automatically as it comes to the rod tip, he merely reverses the sinker on the line. When the end of the sinker contacts the rod it then tightens on the line instead of releasing.

The following are therefore among the objects of this invention: to provide a novel releasable sinker for hook and line fishing, which is engaged to the line positively and at a predetermined location, and which automatically releases to allow the line to be reeled in until the lure is substantially at the rod tip for storage, for removal of fish, or for other purposes as desired;

to provide a sinker as described in which the positive engagement on the line is nonabrasive and suited for any type line without adaption or addition of swivels;

to provide a sinker as described in which the normal position of the sinker on the line is marked for easy resetting of the sinker after release;

to provide a sinker as described in which secure engagement with the line is clearly indicated by an external element of the sinker;

to provide an embodiment of a sinker as described in which engagement with the line is made doubly secure by a backup locking device designed for automatic release;

to provide an embodiment of a sinker as described in which the sinker is engageable for fishing at any of plural preselected positions on the line;

to provide a sinker as described which in embodiment is adapted for the use of drop sinkers or drop hooks;

to provide a sinker as described including a sinker carrier which, in embodiment, is adapted for varying sinker weight without removal of the sinker carrier from the line;

to provide a sinker as described which permits separation of sinker and lure as far as desired without causing difficulty in reaching the lure on reeling in the line;

to provide a sinker device as described in which only one end of the sinker will produce automatic release of the sinker when drawn against the rod, and in which the opposite end of the sinker will tend to tighten the sinker on the line when drawn against the rod;

to provide a sinker arrangement which is especially suited to trot-line use;

and to provide a sinker as described which is economical to produce, durable, safe and convenient in use, and efficiently streamlined in contour.

These and other objects and advantages of the invention will become more apparent on examination of the following description and the drawings in which.

Figure 1:
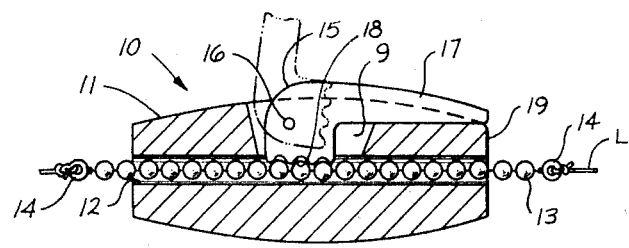
FIG. 1 is a side elevation in partial section of an embodiment of this invention.

Now describing the embodiments in detail, FIG. 1 shows a novel sinker 10 having a tapered body 11 of lead or the like, recessed at 9, and with a cylindrical hole 12 through the length of the body. Passed through the hole 12 is a bead chain 13, preferably of Monel or the like, having an integral eyelet 14 at each end.

Fishing line L is tied to eyelets 14 or is otherwise secured to eyelets 14 by means sufficiently small to pass smoothly through line guides of the fishing rod with which the sinker is to be used. Cam 15, which is preferably of nylon or similar material, is pivotally secured to the body 11 of the sinker by a pin member 16, such as a screw, at recess 9. In the closed position shown in FIG. 1, with handle 17 depressed, the toothed working face 18 of cam 15 engages beads of bead chain 13 and positively locks the sinker assembly 10 in position on the fishing line L.

With handle 17 thrown upwardly to the position indicated by the phantom lines, the teeth, which effectively are offset in a plane or in a curve having a radius which is longer than the pivot-radius, are retracted. The sinker is thus disengaged from the beads of the chain and becomes free to slip on the line.

Disengagement may be manual, but will also occur automatically when end 19 of the sinker is reeled against the tip guide and reeling is continued. Continued reeling pulls bead chain 13 in the direction of the arrow past the toothed working face 18 of cam 15, pivoting the cam to the phantom-line position shown, free of the line. The sinker then slides on the line. Since the bead chain used with a particular sinker is of small diameter relative to line guides of rods normally used with sinkers of that size, and since the bead chain is self swiveling, eliminating the need for ordinary cumbersome swivels, the bead chain can be reeled smoothly through the guides and onto the reel. This allows the user to continue reeling until almost all the line is stored on the reel, and the lure is brought as close as necessary, almost to the point of touching the tip of the rod, if desired.

This inventive provision makes it particularly convenient to remove a fish from the line unassisted, to change lures, or to store the tackle safely and ready for quick and orderly redeployment. To redeploy the line, as in trolling, it is only necessary to strip the line off the reel, retaining the sinker, until the bead chain reappears beyond the tip guide, and to close the toothed cam onto the bead chain. More than one bead chain can be used, spaced along the line to give optional depth positions for the sinker. Bead chains of different sizes are chosen to provide the necessary tensile strengths for use with sinkers employed in various types of fishing.

When end 19 of the sinker is rigged toward the lure rather than the rod, the opposite end of the sinker will contact the tip-guide when the sinker is reeled in to the rod. Releasing action will not occur in this case, but rather the sinker will tend to tighten on the line.

It will be noted that the position of the cam handle 17 gives a clear visual indication of whether the sinker is engaged with the bead chain. Since the toothed cam is made of plastic material and the bead chain is made of metal, pivot 16 can be positioned relative to the working face of the cam during manufacture so as to cause the teeth to bear heavily on the chain without danger of parting the chain when the handle is snapped shut. Overcenter positioning of the pivot in relation to the toothed face tends to keep the handle in the closed or open position, as the case may be.

FIGS. 2, 3, 4 and 5 show a second embodiment, 20, of the sinker of the invention.

Figure 2:
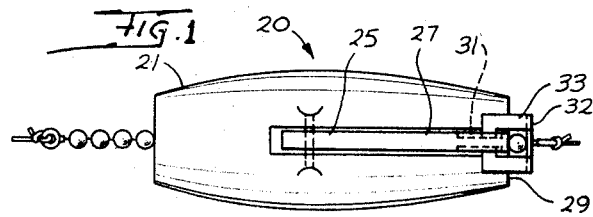
FIG. 2 is a plan view of another embodiment of this invention.
Figure 3:
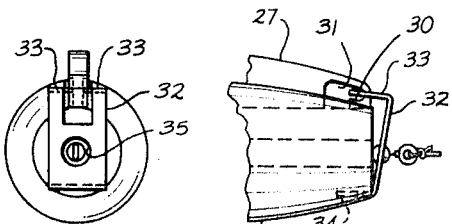
FIG. 3 is an end view of the FIG. 2 embodiment.
Figure 4:
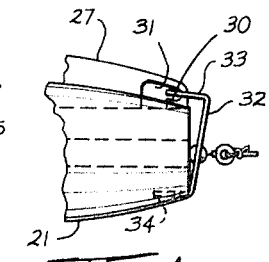
FIG. 4 is a partial side elevation of the FIG. 2 embodiment.

Sinker 20, FIG. 2, differs from sinker 10, FIG. 1, in two respects. Spring 32 is provided, and the end of handle 27 is adapted for retention by the spring.

These modifications comprise an automatic release handle-locking feature. Spring 32 may be of phosphor bronze or the like. It is integrally retained in body 21 of the sinker by an angled extension 34 of the spring which is embedded, as by swaging or casting, in the sinker body. A hole 35 is provided medianly of the spring to allow free passage of the fishing line L, including the bead chain 13. The free end of the spring is forked and bent into spaced, angled, L-shaped downward extensions 33, adapted to engage the sides of the end of cam handle 27.

Cam handle 27 is recessed at 31 in an L-shape on either side, leaving a lug 30 on the lower edge of either side at the extreme end of the handle. When the handle is closed, these handle lugs 30 are engaged by extensions 33 of the spring.

Figure 5:
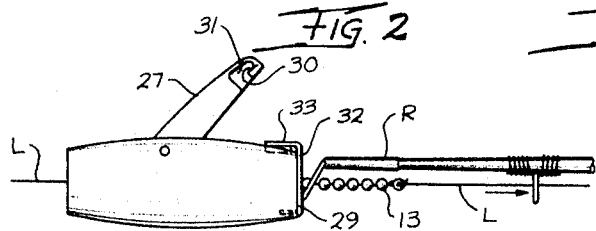
FIG. 5 is a side elevation of the FIG. 2 embodiment in use with fishing tackle.

The handle is released by pressing spring 32 inward against end 29 of the sinker, passing spring extensions 33 free of the handle lugs and into handle recesses 31. As shown in FIG. 5, this releasing pressure is automatically applied to the spring 32 by the tip guide R of the fishing rod when the sinker is reeled in, and, as described above, the cam is then pivoted, releasing the sinker.

The double-locking, or safety locking spring feature of FIGS. 2—5 is adaptable to any of the embodiments of this invention.

Figure 6:
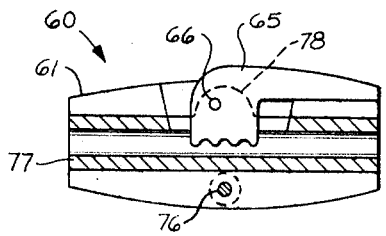
FIG. 6 is a side elevation in section of yet another embodiment of this invention.
Figure 7:
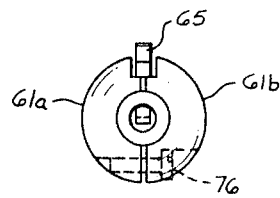
FIG. 7 is an end view of the FIG. 6 embodiment of this invention.

FIGS. 6 and 7 show a further sinker embodiment 60 made according to this invention. In this embodiment the body 61 of the sinker, which is preferably of lead, and which may be made in halves, is retained as by screw 76 to a sinker carrier 77.

Sinker carrier 77 may be of nylon or the like but is preferably of corrosion-resistant metal such as brass, smoothly polished internally and chamfered at the ends. Tab 78 is integral with the carrier and pivotally mounts cam 65 by means of pin or screw 66. The cam is preferably of nylon, as before.

It will be appreciated that the weight of sinker 60 can be varied easily over a wide range, by substitution of different bodies, as by replacement of halves 61a and 61b.

Figure 8:
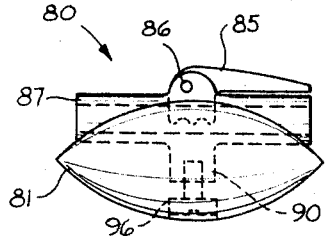
FIG. 8 is a side elevation of another embodiment of this invention.
Figure 9:
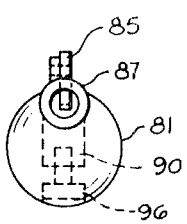
FIG. 9 is an end view of the FIG. 8 embodiment of this invention.

FIG. 8 illustrates a further sinker embodiment 80 in which the carrier 87 is recessed into a unitary sinker body 81. Downward tubular extension 90 of the carrier is threaded to provide for attachment of the body 81 by a screw 96. Bodies of other weights are thus easily substituted as required.

Figure 10:
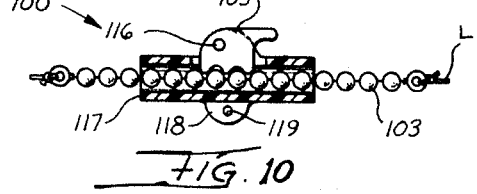
FIG. 10 is a side elevation in section of still another embodiment of this invention.

FIG. 10 illustrates a sinker carrier 100 adapted according to this invention for use with drop sinkers. The tubular body 117 carries two tabs, tab 116 for the handle 105, and tab 118 having a hole 119 for attachment of a drop-sinker line. Hole 119 may be alternatively used for screw attachment of a sinker body to the tab, or sinker body halves may be clasped around the carrier 117 and retained by a screw located apart form the tab, in addition to, and after, attachment of a drop-sinker line.

Figure 11:
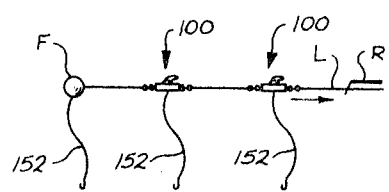
FIG. 11 shows units of this invention embodied in a novel fishing tackle.

FIG. 11 shows plural drop-hook assemblies 152 on a line L rigged to a rod R in the manner of a trot line. The line is buoyed by a float F. The drop-hook assemblies are suspended individually from carriers 100, like that of FIG. 10. It can be seen that, as the line is reeled-in, the individual carriers will release in turn, and congregate at float F, where the hooks can be stored conveniently, or rebaited and reset, as the case may be.

Although the various embodiments have been described specifically and in detail, it is to be understood that this invention may be practiced otherwise than in the precise detail given without departure from the spirit of the invention.

What I claim is:

1. A sinker assembly for use with a line and guide comprising: body means perforate for passage of line means therethrough and having an aperture connective with said perforation, toothed cam means movably secured at said aperture for restraining engagement with line means therein, and line means including bead chain means affixed at each end of said bead chain means to the line means, all said line and bead chain means being of size freely passing through said perforation, and the bead chain means being disposed in said perforation for restraining engagement by said toothed cam means.

2. A sinker assembly as recited in claim 1, said cam means being pivoted to the body means for engagement with and release from said chain means, and having a handle protrusive of the body means in one position of operation of the cam means and adjacent the body in another said position of operation.

3. A sinker assembly as recited in claim 2, one of said cam means and bead chain means being composed of yielding material.

4. A sinker assembly as recited in claim 3, said cam means having a plural toothed working face with the respective teeth adapted to engage plural respective beads of the chain means.

5. A sinker assembly as recited in claim 4, said body means being of lead and being elongated in the direction of said perforation.

6. A sinker assembly as recited in claim 4, said cam means being releasably pivotable in one direction and restrained in the opposite direction by said line means under tension on respective directional constraint of said body means, respective ends of the body means being adapted for providing said respective directional constraints according to orientation of the body means on the line means.

7. A sinker assembly as recited in claim 6, said cam handle having lug means, a resilient member attached to said body means and having an extension spaced therefrom across the end of said body means, said extension adapted to engage the lug means and to be flexed free thereof on contact of the guide with said extension, thereby releasing said cam means to pivot.

8. A sinker assembly as recited in claim 7, said resilient member extension including opposed inwardly and downwardly extending lug engagement means.

9. A sinker assembly as recited in claim 4, said body means including a tubular member having a cam means mounting tab adjacent said aperture.

10. A sinker assembly as recited in claim 9, a member integral with the tubular member and having an attachment hole therein.

11. A sinker assembly as recited in claim 9, said tubular member having a weight removably attached thereto.

12. A sinker assembly as recited in claim 11, said weight comprising weight halves clasped about said tubular member.

13. A sinker assembly as recited in clam 11, said weight comprising a unitary member recessed to receive said tubular member in a surface thereof.

14. A sinker assembly as recited in claim 5, wherein the teeth are in a substantially linear configuration relative to each other and wherein the radius from the pivot perpendicular to the chain in said restraining engagement position passes through an intermediate portion of the working face, thereby making the cam means substantially self-locking when fully engaged with the chain means.

15. A sinker assembly as recited in claim 6, said line means having terminal stop means, and a plurality of said sinker assemblies spaced on said line means in like orientation for release thereof from the line means on successive constraint of the respective body means with respect to the line means, whereby all said assemblies may be gathered against said terminal stop means.